3,054,675
MISCIBLE MALTED MILK POWDER

James F. Hale, Syracuse, and Watson B. Smith, North Syracuse, N.Y., assignors to The Borden Company, New York, N.Y., a corporation of New Jersey
No Drawing. Filed June 29, 1960, Ser. No. 39,437
3 Claims. (Cl. 99—56)

This invention relates to a miscible malted milk powder and to the process of making it.

Heretofore, malted milk powders have not been readily dispersible in liquids such as milk or water. They become miscible only with great difficulty as by prolonged mechanical agitation. When placed on the surface of milk, or other liquid, the powders tend to "ball up" and not disperse into the liquid; i.e., they have an unsatisfactory sinkability and miscibility.

It has now been found that malted milk powders can be prepared which sink rapidly when placed on the surface of a liquid and which are readily stirred into solution.

Briefly stated, the present invention comprises a malted milk powder in which the individual particles thereof have adhered thereto lecithin.

The invention also comprises the herein described process of making the malted milk powder wherein molten lecithin is applied to the surfaces of softened malted milk powder particles.

As to materials, the malted milk powder used is preferably a natural malted milk powder of any commercial variety. This powder is usually made by drying a mixture consisting essentially of whole milk combined with the fluid separated from an enzyme converted infusion of ground barley malt and wheat flour. Malted milks contain about 2.9% to 10% butter fat, generally 7.5% or more, and not more than 3.5% moisture.

The lecithin used to coat the malted milk is any commercial lecithin. In fact, the commercially refined grades of lecithin, such as soya bean lecithin, seems to work somewhat better than the more highly purified lecithin. This advantage being considered to be due in part to a wider range of softening temperatures of the commercial material and, therefore, wider range of temperature over which the lecithin is tacky or sticky during the preparation of the miscible malted milk powder.

The lecithin is used in an amount sufficient to make a rapidly dispersable malted milk powder. Suitable proportions of lecithin used to obtain such a result are 0.2–5 parts by weight for 100 parts by weight of the malted milk powder and preferably from 0.75 to 2 parts by weight.

The conditions of preparing the miscible powder are important. The malted milk powder is stirred and heated to a temperature of softening but below the actual melting thereof, namely a temperature of 110° to 150° F., preferably from 130° to 145° F. The heated malted milk powder is constantly stirred and molten lecithin at a temperature of 130° to 190° F. is applied, preferably by spraying, to the powder. It is considered that one of the reasons for the rapid dispersability of the malted milk powder is that the heating of the powder provides a more satisfactory surface on which to apply the lecithin and have it adhere to the powder particles. Molten lecithin applied to a cold powder tends to ball up and not adhere to the powder particles.

The stirring of the malted milk and lecithin mixture is continued for sufficient time, normally from 15 to 30 minutes, after the last of the lecithin has been added to insure adherence of the lecithin to the surface of the particles of malted milk. The resulting product is cooled and then ready for shipment or use in a liquid, such as water or milk, to make a malted milk beverage. Under microscopic examination the lecithin appears as discrete globules adhered to the malted milk particles.

The product can also be sifted, as through a 16 mesh screen, to insure that any lumps formed due to insufficient mixing are broken up into individual coated particles of malted milk.

It is also possible to incorporate flavoring materials with the product of the present invention. Flavorings such as vanilla, cocoa, chocolate and fruit flavorings may be added in any conventional proportions and mixed with the malted milk powder either before or after the spraying with the molten lecithin is effected.

The resultant product shows no coherence between the coated particles and is free flowing. The product rapidly sinks into milk and water when placed on the surface thereof and is easily dispersed with slight agitation to provide an improved malted milk beverage.

The product has a sinkability of less than 50 seconds as opposed to a lack of complete sinkability in milk for malted milk products without the lecithin. As used herein the term "sinkability" means the time, in seconds, required for 1 teaspoon, or 10 grams, of malted milk placed on the surface of ½ cup, or 4 fluid ounces, milk, or other selected liquid, to disperse into the body of the milk at a temperature of 40–50° F.

The invention will be further illustrated by description in connection with the following specific examples of the practice of it. In these examples and elsewhere herein proportions are expressed as parts by weight unless specifically stated to the contrary.

Example 1

| | Parts |
|---|---|
| Malted milk, single grind | 100 |
| Lecithin, soya bean | 1.4 |

The malted milk was passed through a vertical countercurrent air heater and heated to a temperature of 145° F. The softened malted milk was then placed in a ribbon blender and molten lecithin, at 150° F., sprayed slowly and uniformly onto the malted milk powder as the mass was being mixed. The mixing was continued for 15 minutes after the addition of the lecithin was completed at which time the malted milk powder had adhered thereto the lecithin and was substantially non-tacky. The product was then removed from the mixer, sifted through a 16 mesh screen and filled into appropriate containers.

The final product had a sinkability of 30 seconds when placed on the surface of milk and readily dissolved on stirring.

Example 2

| | Parts |
|---|---|
| Malted milk | 100 |
| Lecithin | 1.75 |

The malted milk, at room temperature, was placed in a ribbon blender and hot air at 300° F. was blown into the mixer through openings at the top. The ribbon blender was operated for 20 minutes, until the malted milk reached a temperature of about 125° F., and the lecithin, in a molten condition and at a temperature of 150° F., was then sprayed onto the malted milk particles by means of two pneumatic nozzles protruding into the mixer. The mixing was then continued for a period of approximately 15 minutes, during which time the lecithin adhered to the matled milk particles and the coated particles became substantially non-tacky. The product was then removed from the mixer and sifted.

Example 3

The malted milk powders made as set forth in Examples 1 and 2 were compared as to sinkability in milk and water with malted milk powders that have not been admixed with lecithin. The tests were carried out by placing one teaspoon (10 grams) of each powder on each of the surfaces of ½ cup of milk and ½ cup of water and measuring the time required for the milk powder to disperse in the liquid at 45° F.

The results were as follows:

|  | Sinkability in seconds | | Miscibility | |
| --- | --- | --- | --- | --- |
|  | Milk | Water | Milk | Water |
| Product of Example 1 | 30 | 5 | Stirs in completely | Stirs in completely. |
| Product of Example 2 | 28 | 4 | do | Do. |
| Regular Malted Milk (no heating and no lecithin): | | | | |
| a. Specimen 1 | Product floated on surface, No appreciable sinking in 300 seconds. | Product floated on water, no appreciable sinking in 300 seconds. | Poor miscibility, powder balls up and remains on surface of milk after agitation. | Poor miscibility, most of product balls up and remains on the surface of water. |
| b. Specimen 2 | do | do | do | Do. |
| c. Specimen 3 | do | do | do | Do. |

While the exact theory for the rapid and efficient dispersability of the malted milk powders of the present invention is not known, it is considered that the lecithin, because of its ability to imbibe water, prevents the agglomeration, or balling up, of the malted milk particles and thereby results in a quicker and more uniform wetting of the powder.

It will be understood that it is intended to cover all changes and modifications of the examples of the invention herein chosen for the purpose of illustration which do not constitute departure from the spirit and scope of the invention.

We claim:

1. The method of making a readily miscible malted milk powder comprising the steps of heating malted milk powder to a temperature of softening but below the melting point thereof, mixing molten lecithin with the heated powder, and stirring until the lecithin is substantially adhered to the particles of malted milk.

2. The process of claim 1 wherein the proportion of ingredients by weight is about 0.2–5 parts of lecithin to 100 parts of the malted milk powder.

3. The method of making a readily miscible malted milk powder comprising the steps of heating malted milk powder to a temperature of between 110° to 150° F., spraying molten lecithin thereover at a temperature of about 150° F. and in the proportion by weight of about 0.2 to 5 parts of the lecithin to 100 parts of the malted milk, and continuously stirring until the lecithin is substantially adhered to the malted milk particles.

References Cited in the file of this patent

UNITED STATES PATENTS

| | | |
| --- | --- | --- |
| 2,399,565 | North et al. | Apr. 30, 1946 |
| 2,507,482 | Scott | May 9, 1950 |
| 2,611,708 | Owens et al. | Sept. 23, 1952 |
| 2,819,971 | Gunthardt | Jan. 14, 1958 |
| 2,910,362 | Davis et al. | Oct. 27, 1959 |